United States Patent [19]
Inoue

[11] 3,926,646
[45] Dec. 16, 1975

[54] PREPARATION OF DENTAL CEMENTS

[76] Inventor: Kiyoshi Inoue, No. 16-8 3-chome, Kami-Yoga, Setagaya-ku, Tokyo, Japan

[22] Filed: Apr. 26, 1974

[21] Appl. No.: 464,367

Related U.S. Application Data

[63] Continuation of Ser. No. 873,204, Nov. 3, 1969, abandoned, which is a continuation-in-part of Ser. No. 731,258, May 22, 1968, abandoned.

[52] U.S. Cl........................................ 106/35; 32/15
[51] Int. Cl.²........................................... C09K 3/00
[58] Field of Search....... 164/48, 51; 106/35; 32/15; 264/22–24, 25; 219/10.55 R, 10.55 E, 10.55 M

[56] References Cited
UNITED STATES PATENTS

| | | | |
|---|---|---|---|
| 1,509,161 | 9/1924 | Maurer | 32/15 |
| 2,500,866 | 3/1950 | Ramsay | 264/27 |
| 2,522,298 | 9/1950 | Ramsey | 264/27 |
| 2,665,218 | 1/1954 | Saffir | 106/35 |
| 2,841,856 | 7/1958 | Gelbman | 264/27 |
| 3,365,522 | 1/1968 | Inoue | 264/23 |

*Primary Examiner*—Theodore Morris
*Attorney, Agent, or Firm*—Owen, Wickersham & Erickson

[57] ABSTRACT

Dental cement with superior crushing strength is made from (1) one or more of zinc oxide, silicon oxide, and aluminum oxide, containing conventional additives, if desired, (2) 0% to 20% of a fluoride such as calcium or sodium fluoride, (3) phosphoric acid, diluted and containing additives, if desired. To impart the superior crushing strength, these ingredients are spatulated while applying an electric field across the mixture, either direct current alone, or preferably, direct current on which is superimposed a high-frequency alternating current. The resulting cement is much stronger, adheres better to teeth, and reduces the development of bacteria.

12 Claims, 4 Drawing Figures

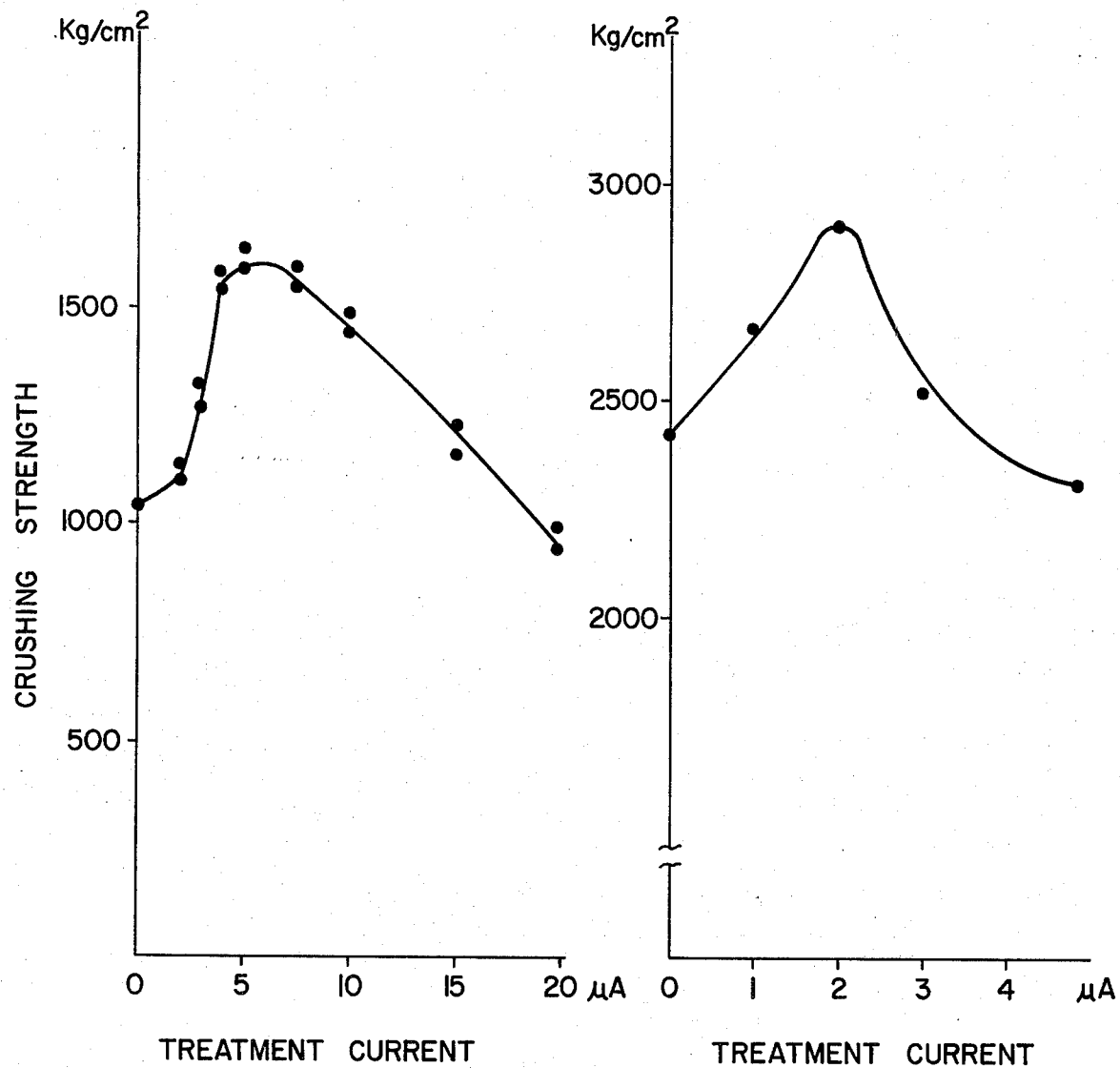
FIG_1
FIG_2

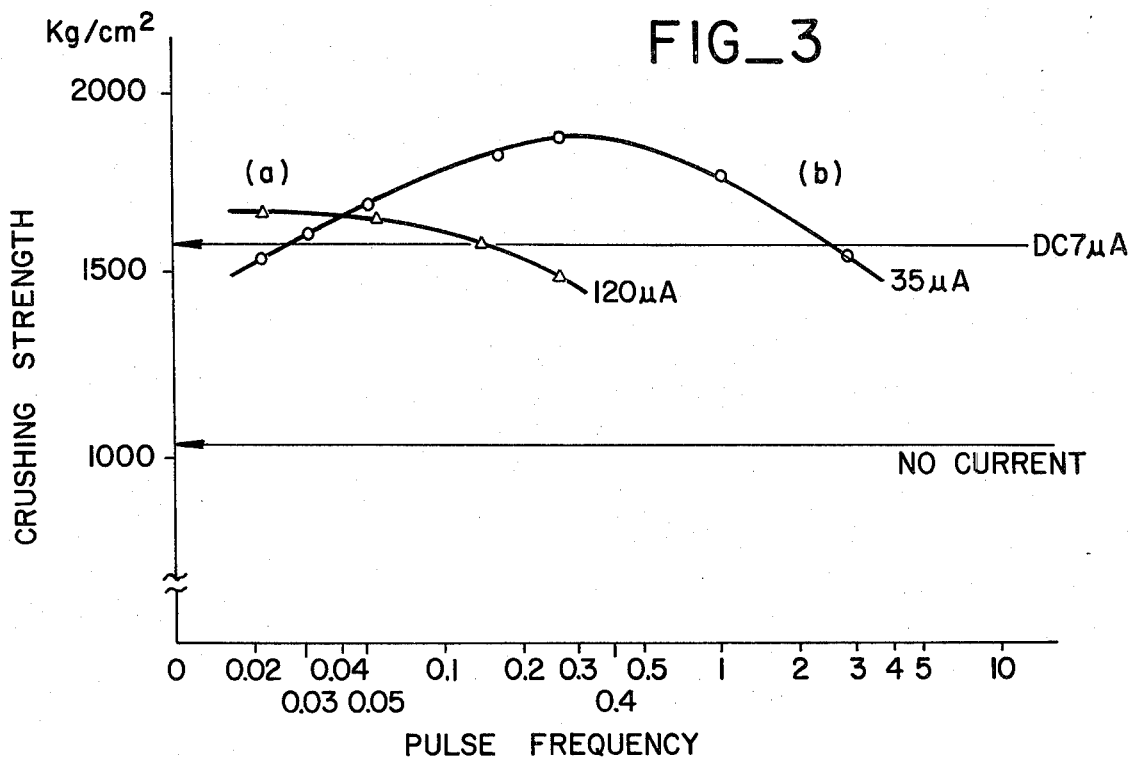
FIG_3
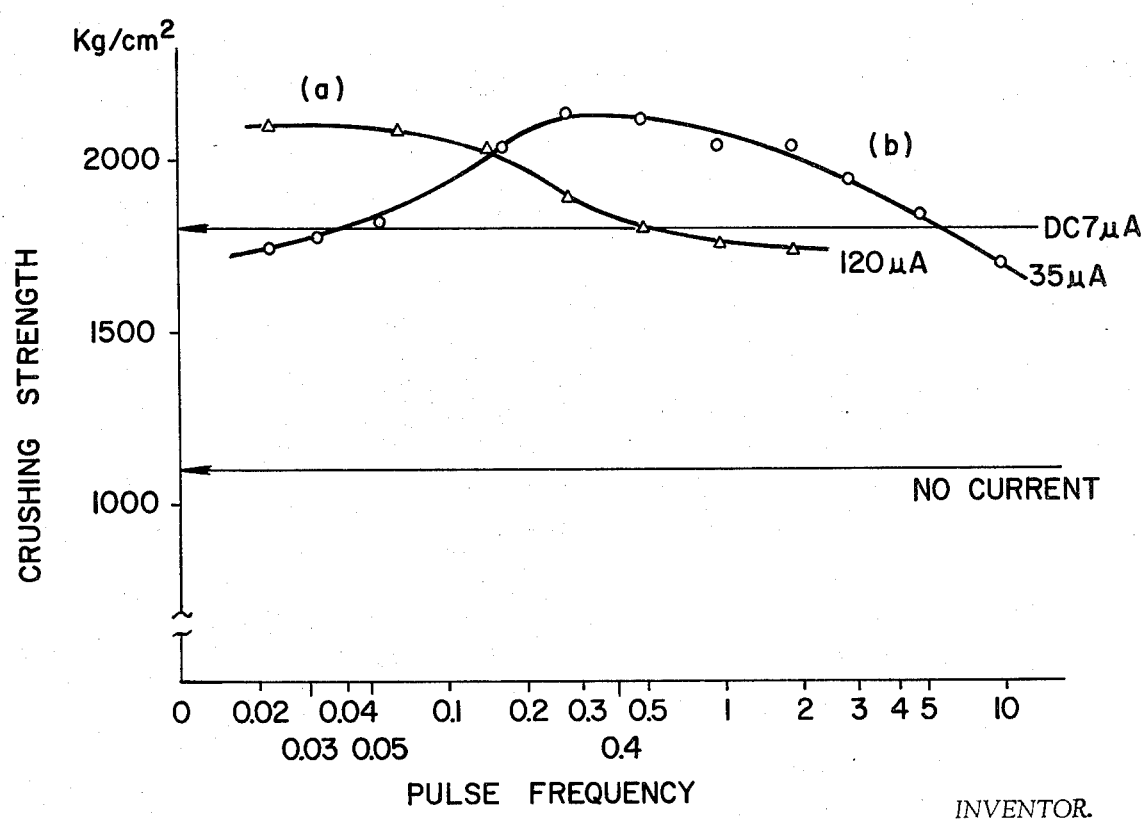
FIG_4

PREPARATION OF DENTAL CEMENTS

This is a continuation, of application Ser. No. 873,204, filed Nov. 3, 1969, now abandoned which was a continuation-in-part of application Ser. No. 731,258 filed May 22, 1968, now abandoned.

The present invention relates to improved dental cements. More particularly it pertains to the preparation of cements in paste form for dental clinical purposes, i.e., for filling a cavity and for lining and sealing teeth as well as cementation in inlay, crown and bridge applications, etc.

Of various proposals made hitherto in this field, the most widely used today can be classified into three categories, namely, zinc-phosphate, silicate, and silico-phosphate cements. These cements have customarily been prepared by spatulating or kneading finely divided material, usually oxides of certain metals, the exact composition depending on the type of cement desired, along with an aqueous phosphoric acid solution, on a suitable slab with a suitable spatulating instrument. For example, zinc-phosphate cement is prepared by using zinc oxide as a primary constituent of the powder, while silicate cement is prepared mainly from admixed silica and alumina. Silico-phosphate cement, which may be said to be a blend of the above two is produced from admixed silica, alumina, and zinc oxide. In each of these particular cements, it has been common to employ a minor amount of additives in an effort to facilitate and/or control the chemical reaction, which, accompanying heat generation, is effected between the oxides or other powdered substances and the phosphoric acid solution during the stages of spatulation and subsequent setting. Thus, oxides of magnesium, bismuth, silicon, calcium, copper, barium, sodium, potassium, beryllium, and nickel and also barium sulfate, barium chromate, calcium silicate, calcium phosphate, aluminum phosphate, and phosphorus pentoxide have been incorporated singly or in mixtures into each of the above systems. The spatulating procedure, which generally involves manual revolving and reciprocating movement, is effective to render the admixed powder and liquid viscous to the extent that they form a paste immediately applicable to a desired location in or on a tooth. Among other cements that have been proposed in the field are the so-called copper cement incorporating copper oxide, copper iodide, or copper silicate with additives such as barium sulfate and/or talc in the system of zinc-phosphate as mentioned above, and silver cement incorporating silver chloride or silver phosphate with similar additives in a similar system.

In every case, however, these conventional compositions and procedures have been less than satisfactory relative to the strict requirements in dental clinics, because of the poor mechanical strength of the resultant solid cements and their inacceptable failure to adhere to a tooth and other body such as inlay, crown, or bridge. Furthermore, the conventional procedure has been entirely ineffective in preventing the body of the tooth from decaying.

It has also been suggested that the incorporation of fluoride into such cement compositions might alleviate the previous difficulties, but this procedure, too, has been found to accomplish little in the prevention of tooth decay.

It is therefore an object of the present invention to provide a unique method for preparing cements applicable for almost every dental clinical use, whereby the resultant cements are superior in mechanical and physical properties.

Another object of the invention is to provide a novel method for preparing dental cements useful in restraining bacterial infection and for actively preventing an applied tooth from decaying without imparting chemical toxicity to the tooth, the palate, or other parts of the mouth.

Yet another object is to provide a method for setting a dental cement that is applied to a desired portion, whereby the resultant cement is still further improved in its mechanical and germicidal properties.

The present inventor has discovered that for the successful preparation of superior cements, conventional compositions can surprisingly be made available when they are subjected to an electrical reaction procedure in the stage of spatulation and/or in the subsequent setting period.

Thus, the method of the present invention involves the steps of (1) preparing finely divided material consisting predominantly of oxides usable for the aforementioned conventional phosphoric cements and including where desired, up to about 20% by weight of one or more fluoride compounds, and (2) spatulating or kneading this powdery admixed material with a liquid containing phosphoric acid while applying an electric potential across the body of the spatulated material. The term "phosphoric cement" is herein intended to designate every dental cement produceable from admixed oxide powder and phosphoric acid solution and includes the conventional zinc-phosphate, silicate, silico-phosphate, copper, silver systems, etc. One such method comprises the steps of preparing finely divided material, having in major part at least one oxide selected from the group which consists of zinc oxide, silicon oxide and aluminum oxide, mixing said material with a liquid containing phosphoric acid and water, and spatulating said material and liquid mixture to form a paste cement while applying an electric field across the body of said paste cement.

The fluoride, if used, is preferably calcium fluoride or sodium fluoride, but may be potassium fluotitanate, sodium fluosilicate, sodium fluoaluminate, or magnesium fluoride in finely divided form which can be mixed prior to spatulating with a major proportion of the principal powder.

The principal powder (i.e., the powder before the addition of the fluoride which plays such an important role in the present method) may be one prepared in a well known conventional manner. When a zinc-phosphate is intended, the principal powder may consist in major proportion of zinc oxide and have, as additives, oxides of magnesium, silicon, bismuth, etc. For a silicate cement, it may consist mainly of silica and alumina with a lesser amount of additives such as calcium oxide, calcium, fluorine, sodium oxide, sodium, phosphorus pentoxide, etc. For a silico-phosphate cement, it may consist mainly of zinc oxide, silica and alumina with lesser proportion of additives such as magnesia, calcium, and sodium phosphates. For a copper cement, it may consist mainly of zinc oxide with a minor part of copper oxide, copper iodide or copper sulfate and with other additives such as barium sulfate or talc and, for a silver cement, such copper compound is replaced by silver chloride or silver phosphate.

The fine powder, whether or not it contains fluoride, then can be spatulated, the physical action of spatulation being carried on in accordance with conventional practice. The liquid here used as a solvent or chemical reactant with material of such composite powder may be a conventional composition. For example, should a zinc-phosphate cement be prepared, orthophosphoric acid with the balance of water and aluminum phosphate solution can successfully be utilized. For the preparation of a silicate cement, zinc and/or magnesium phosphates are added to such liquid composition, while reducing the proportion of orthophosphoric acid and aluminum phosphate to a substantial degree. For silico-phosphate cement, copper cement and silver cement, similar liquid can be used.

However, contrary to conventional practice, the spatulation of the powder/liquid mixture is, in this invention, carried on substantially concurrently with the application of an electric field across the spatulated body for the period of about one-half minute to five minutes. To this end, a pair of electrodes is provided, in juxtaposed relationship with one another across the mixture of powder and liquid which is forming a paste. I have found that when relatively low-power electrical energy is supplied across these electrodes through the paste forming mixture, the resultant solid cement shows excellent mechanical properties, as measured in terms of crushing strength and surface adhesion with tooth, metal, porcelain and other body,—properties not obtainable with conventional practices.

While the precise theory which can fully explain what occurs in the course of the process and how it is related to the results has still not been established, it is seen that the electrical energization involves or facilitates the formation of some unique grain products possibly including the fluoride compound where fluoride is present and compounds at the interfaces of individual particles, which with an affinity join with the remaining crystal grains formed and/or with matrices of cores. In any event, crushing strength is improved whether or not fluorides are present. Furthermore, it has been found that the results are still further improved when a high-frequency alternating or periodic potential is used in superimposition upon a direct-current voltage for the electrical energization of paste. The electrical energization or reaction treatment can be effectively conducted even in the stage of setting where paste cement has been applied to a tooth and the coagulating reaction has partly or substantially been completed.

Further investigation has indicated that the cement thus formed serves as an active decay inhibitor for an applied tooth without any accompanying chemical toxicity. While the mere introduction of fluoride into the cement composition has little effect, the electrical energization or reaction process does effectuate a surprising result in this respect. Although the precise mechanism by which this process inhibits decay and pulp-death is not clear yet, here again, at present, it appears that the use of electrical energy promotes the formation of composites adapted to release fluorine or fluoride ions (when fluoride is in the cement) along surfaces of the filled cement in the tooth. Although the amount of released ions detectable may be quite small, they are believed to combine with organic substances or contaminants adhered to or present in the proximity of such surfaces to convert them into inactive or degenerated products, and thus to deter bacterial infection of the body of the tooth.

In the drawings:

FIG. 1 is a graph in which treating current during spatulation is plotted against crushing strength obtained thirty minutes later, as described in Example V below.

FIG. 2 is a similar graph obtained from a different cement, per Example VI below.

FIG. 3 is a graph of pulse frequency plotted against crushing strength to give two curves, per Example VII below.

FIG. 4 is a graph like FIG. 3 but with the cement containing calcium fluoride, per Example VIII below.

EXAMPLE I (Prior-art method, Zinc Phosphate Cement)

A conventional zinc-phosphate cement was prepared from fine powder consisting of 88% (by weight) of zinc oxide with the balance 10% of magnesia and 2.0% of bismuthic oxide. A solvent is prepared containing 56% (by weight) free orthophosphoric acid and 13.50% aluminum phosphate, with the balance of water. The powder/liquid mixture was spatulated for 3 minutes at a temperature of 24°C. and a humidity of 40%, and a paste was formed whose viscosity allowed more than 8 cm stretch without breaking. Under the same atmospheric conditions, the paste was solidified. Crushing strength was measured after the prepared paste cement was held in a die at a temperature of 25° C. and a humidity of 50% for a specified period (1 hour, 24 hours) and then retracted for test. Its crushing strength was 900 kg/cm$^2$ after 1 hour and 1000 kg/cm$^2$ after 24 hours. The strength of adhesion with a tooth (calcium phosphate) was 3.5 kg/cm$^2$. Also, the prepared cement was held at 37°C. temperature and 70% humidity under conditions similar to those in a mouth, and after a holding interval of 165 hours, the development of bacteria was observed.

EXAMPLE II (Zinc-Phosphate cement with added Calcium fluoride)

Similar zinc-phosphate cement was prepared by adding 6% by weight of the principal powder of fine calcium-fluoride ($CaF_2$) powder to the principal powder, which was otherwise identical to that used in Example I. The same solvent composition was used as in Example I, and the same conditions and time for spatulation obtained. Crushing strength was measured after the same conditions and in the same manner as in Example I. The cement had crushing strengths of 930 kg/cm$^2$ after 1 hour and of 1000 kg/cm$^2$ after 24 hours and the strength of adhesion with tooth of 4 kg/cm$^2$. After the lapse of 165 hours, the development of bacteria in the cement was observed.

EXAMPLE III (D-C applied during spatulation of cement with added Calcium Fluoride)

An improved zinc-phosphate cement embodying the principles of this invention was then prepared, using 5% by weight of the principal powder of fine calcium fluoride ($CaF_2$) powder admixed with 95% by weight of the principal powder of Example I and using the same phosphoric acid composition used therein. In this instance, while the powder/liquid mixture was spatulated for 3 minutes, just as in Example I, a direct current potential of 5 volts with a current of 3 microamperes was applied between a molybdenum electrode and a tin electrode disposed in juxtaposed relationship with one another across the spatulating paste for 1 minute.

Under the same conditions as employed in the Examples I and II, tests were conducted. The cement had crushing strengths of 1200 kg/cm² after 1 hour and 1600 kg/cm² after 24 hours, and a strength of adherence with the tooth of 14.2 kg/cm². After the passage of 165 hours, no development of bacteria was observable.

EXAMPLE IV (A-C imposed upon D-C during spatulation of cement of Example III)

A high-frequency alternating current of 5 microamperes with 5 volts at 3 kHz was superimposed upon a direct current of 3 microamperes and 3 volts, for the treatment of spatulated powder/liquid mixture of Example III for the period of 3 minutes. The resultant cement, after the same tests as in Example I, had crushing strengths of 1300 kg/cm² after 1 hour and 1800 kg/cm² after 5 hours, and the strength of adherence with the tooth was 13.1 kg/cm². After 165 hours, no bacteria development was observable.

EXAMPLE V (D-C during spatulation, Zinc-Phosphate Cement)

Conventional zinc-phosphate cement (powder: 1.55 grams, phosphoric liquid: 0.4cc) was spatulated for 1½ minutes by a stainless-steel spatulator serving as a cathode on a molybdenum plate serving as an anode. Electric current of varying d-c amperages was passed between these electrodes through the spatulated cement for a period of 1 minute during the spatulation. Crushing strength of the resultant cement, which was measured after the prepared cement was held firmly in a die at a temperature of 37° C. and a humidity of 100% for a period of 30 minutes and thereafter retracted from the die, is shown by graph of the attached FIG. 1 in which the abscissa represents electric current in microamperes and the ordinate represents the crushing strength in kg/cm². It will be seen that the best results are obtained when electric current passed through the spatulated cement ranges between 3 and 15 microamperes.

EXAMPLE VI (D-C during spatulation of Silicate Cement)

Similarly, a conventional silicate cement was treated and tested. The cement was spatulated for 1.5 minutes, during which it was subjected to electric current ranging between 0 and 10 microamperes for a period of 30 seconds. Results are shown in FIG. 2. It will be seen that best results are obtained when electric current ranges between 0.1 and 3 microamperes.

EXAMPLE VII (Current pulses during spatulation of Zinc-Phosphate Cement)

A train of rectangular current pulses of varying frequencies in a range between 25 Hz and 10 kHz was passed through conventional zinc-phosphate cement being spatulated. Peak current was first chosen to be 35 microamperes and next 120 microamperes. Results were compared with those obtained with a d-c current of 7 microamperes and further with those with no current (prior art) as shown in the graph of FIG. 3, in which the abscissa represents the pulse frequency and the ordinate represents the crushing strength obtained after keeping the prepared cement in a die at 37° C. and 100% humidity for 30 minutes and in which curve (a) shows the results obtained with 120 microampere treatment pulse current of various frequencies and (b) shows the results obtained with 35 microampere pulse current of various frequencies.

EXAMPLE VIII (Practice similar to Example VII, with Calcium Fluoride)

FIG. 4 shows still better results obtained in a similar manner to Example VII above, with the exception that fluoride, such as calcium fluoride, was contained. The amount used may be from 1% to 5%, with 3.5%, preferable. These percentages are by weight and are percents of the weight of the zinc-phosphate cement.

The invention described is believed to admit of many modifications within the ability of persons skilled in the art, all such modifications being considered within the spirit and scope of the appended claims.

What is claimed is:

1. In the method of making a settable dental cement in paste form wherein finely divided oxide material is mixed with a liquid containing phosphoric acid and water to form a dental paste admixture, the improvement consisting essentially of preparing such admixture, incorporating from 0 to 20% fluoride compound therein, spatulating the resultant admixture for from 0.5 to 5 minutes to form said paste, and applying an electric field by low-power electrical energy across said admixture to cause an electric current of microampere order to pass therethrough during spatulation for a time sufficient to form a dental cement of enhanced crushing strength when set, as compared with that of such cement not so treated.

2. A method as in claim 1 wherein said current is from 0.1 to 120 microamperes.

3. A method as in claim 1 wherein there is applied across said admixture an electrical potential of about 5 volts.

4. A method as in claim 1 wherein said energy is applied as a train of shaped pulses.

5. A method defined in claim 1 wherein said electric field is a unidirectional field.

6. A method as in claim 5 wherein said dental cement paste is zinc phosphate cement paste and said current is from 3 to 15 microamperes.

7. A method as in claim 5 wherein said dental cement paste is conventional silicate cement paste and said current is from 0.1 to 3 microamperes.

8. The product resulting from the method of claim 1.

9. A method defined in claim 1 wherein said fluoride is calcium fluoride.

10. A method defined in claim 1 wherein said fluoride compound is sodium fluoride.

11. The method of claim 1 having additives chosen from the group consisting of the oxides of magnesium, bismuth, calcium, and sodium.

12. A method as in claim 1 wherein said oxide material is selected from the group consisting of zinc oxide, silicon oxide and aluminum oxide.

\* \* \* \* \*

UNITED STATES PATENT OFFICE
CERTIFICATE OF CORRECTION

Patent No. 3,926,646　　　　Dated December 16, 1975

Inventor(s) Kiyoshi Inou

It is certified that error appears in the above-identified patent and that said Letters Patent are hereby corrected as shown below:

On the cover sheet insert:

-- [30] Foreign Application Priority Data

|  | Japan | 43-10960 | Feb. 20, 1968 |
|---|---|---|---|
|  | Japan | 44-24998 | April 1, 1969 |
|  | Japan | 44-30467 | April 19, 1969 --. |

Signed and Sealed this

*eleventh* Day of *May 1976*

[SEAL]

Attest:

RUTH C. MASON　　　　　　　　　　C. MARSHALL DANN
*Attesting Officer*　　　　　　　*Commissioner of Patents and Trademarks*